United States Patent [19]
Harkness et al.

[11] 3,830,036
[45] Aug. 20, 1974

[54] GROCERY PACKAGING MACHINE
[75] Inventors: Kenneth A. Harkness; D. Mark Kettunen; Paul E. Schirtzinger, all of Columbus, Ohio
[73] Assignee: Kenneth A. Harkess d/b/a IDEAnamics, Columbus, Ohio
[22] Filed: Feb. 20, 1973
[21] Appl. No.: 333,561

[52] U.S. Cl.................... 53/76, 53/182, 53/184, 53/391
[51] Int. Cl..... B65b 53/02, B65b 57/10, B65b 9/02
[58] Field of Search....... 53/76, 180, 182, 184, 390, 53/391

[56] References Cited
UNITED STATES PATENTS

| | | | |
|---|---|---|---|
| 3,340,996 | 9/1967 | Cerf | 63/180 X |
| 3,342,306 | 9/1967 | Fabbri | 53/182 X |
| 3,513,662 | 5/1970 | Timmerbeil | 53/76 X |
| 3,673,765 | 7/1972 | Dohmeier et al. | 53/391 X |

*Primary Examiner*—Robert L. Spruill

[57] ABSTRACT

A machine for automatically packaging heterogeneous grocery store articles in heat shrinkable, thermoplastic film. The machine has a loading station at one end and an endless conveyer having a series of loading zones which is advanceable in discrete loading zone increments along a treatment passageway. Upper and lower film feed rolls feed film ribbons above and below the articles when the film ends are anchored to the conveyer by grocery articles and the conveyer is advanced. When the conveyor is stopped, a welding and severing means at a downstream weld station descends to bond the film ribbons together and sever the covering film from the feeding ribbons. A carriage, on which infrared radiators are mounted at a further downstream shrink station, descends to shrink the film tightly around the articles during the nexy machine cycle. A subsequent cooling station permits sufficient heat loss for safe handling of the packages.

13 Claims, 12 Drawing Figures

GROCERY PACKAGING MACHINE

BACKGROUND OF THE INVENTION

This invention relates generally to packaging machines and more particularly relates to a machine which can be cooperatively situated at a check-out counter at a grocery store for automatically wrapping purchased articles in durable, protective and conveniently carryable packages.

In modern supermarket merchandising, great quantities and varieties of consumer articles are displayed in rows of display shelves. They are packaged in containers of many different types, sizes and shapes. Customers typically push a cart along these rows and select the articles they desire to purchase, placing them in the cart as they go. The cart of articles is brought to a check-out counter where an attendant tallies each article and slides it to a separate collection area. These articles are then lifted and placed in paper bags either simultaneously by a second employee or by the same attendant after all articles have been tallied.

This checking out and packaging operation is the major source of problems, expenses and irritation for both the supermarket operators and their customers. These operations consume considerable time and require relatively large numbers of employees. The operations also constitute the major traffic delay or bottle neck in the supermarket operation.

Consequently, there is a need for a machine which can reduce the time and the cost of the check-out and the packaging operation in a grocery store or other similar operation selling heterogeneous articles, such as, for example, hardware or dry goods stores.

Additionally, the paper bags, traditionally used for packaging grocery articles, are limited in strength so that when fully loaded, they must be carried by being supported beneath the entire contents. Thus, filled grocery bags can not be gripped by a hand and carried with the arm in a more comfortable downwardly extended orientation. Paper bags instead require that an upturned palm be placed beneath the entire package with the arm extended horizontally forward.

Paper bags sometimes become moistened or wet from leakage of their contents, from being set upon a wet surface or from rain or snow. Such moisture immediately destroys their strength and their ability to contain the grocery articles resulting in inconvenient dropping and often breakage or spillage of their contents. Also, such paper bags offer little protection from rain or splashed water.

There is therefore a need for a grocery packaging machine which provides a package having improved durability, protectibility and comfortable and convenient gripping and carrying.

SUMMARY OF THE INVENTION

The invention is an apparatus for packaging heterogeneous grocery articles and the like and has a support frame with a frontal, horizontal opening forming an unobstructed loading station above the opening. An article treatment passageway extends downstream through the frame from the loading station. An endless conveyer formed into an endless series of loading sections or zones which are positionable beneath the loading station is drivingly advanceable in discrete loading zone increments downstream along the passageway. Hereinafter, the terms loading section and loading zone are used interchangeably. A film feed means feeds both a first film ribbon loosely onto the conveyer in a feeding direction past the loading station and a second film ribbon in unobstructive avoidance of the loading station downwardly to the first film ribbon. The film feed means is actuable to feed film when the film is anchored to the conveyer by articles and pulled by advancement of the conveyer. Mounted downstream of the loading station is a transverse welding and severing means for bonding the first film ribbon to the second film ribbon between loading zones and for severing the ribbons intermediate the bond. Further downstream is a heat shrink means for shrinking film positioned at a shrink station. A control means is provided for advancing the conveyer one loading zone increment in response to a momentary manual actuation and for controlling the operation of the heat shrink means and the welding and severing means.

It is an object of the invention to provide an improved article packaging means.

Another object of the invention is to speed up and automate the packaging of grocery articles.

Another object of the invention is to provide an automatic packaging machine which permits grocery articles to be handled only once during the tallying process and avoids separate handling for packaging purposes.

Another object of the invention is to eliminate the need for a second employee to package grocery articles.

Another object of the invention is to provide a grocery article package which is easily gripped and carried in a comfortable manner, is water-proof for protecting its contents and doesn't weaken upon exposure to moisture.

Further objects and features of the invention will be apparent from the following specification and claims when considered in connection with the accompanying drawings illustrating the preferred embodiment of the invention.

Figure 1:
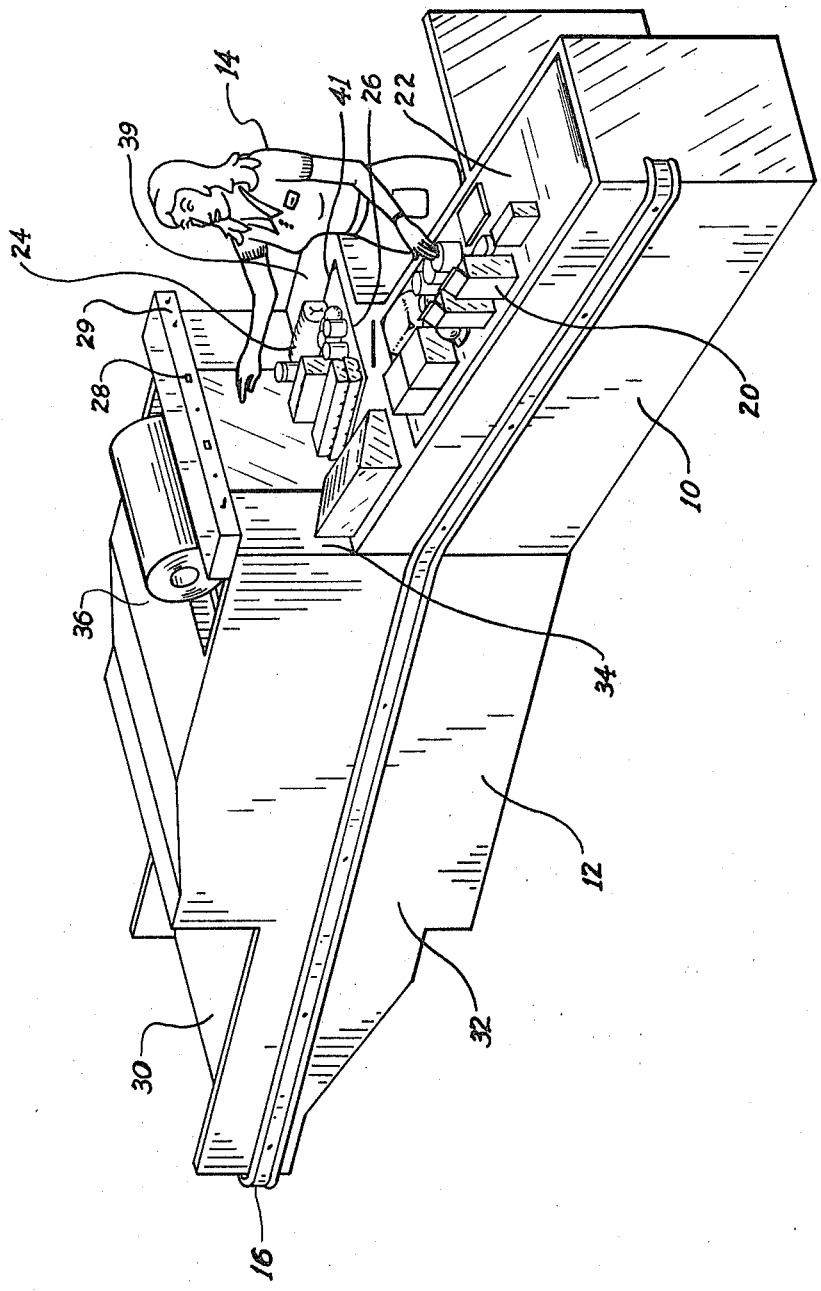
FIG. 1 is a pictorial view in perspective of an entire check-out packaging counter operation in a supermarket utilizing the automatic packaging machine of the present invention.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose.

DETAILED DESCRIPTION

FIG. 1 illustrates a typical grocery store installation including the preferred embodiment of the invention. This typical installation includes a check-out counter 10 and a packaging machine 12 constructed according to the present invention. Both are controlled by an attendant 14. Described very briefly and broadly, a customer with a grocery cart (not shown) filled with selected articles proceeds to the check-out counter 10 which is protected from moving grocery carts by a horizontal guard rail 16. The customer unloads the selected articles, indicated generally as 20 onto a conveyor 22.

The attendant 14 individually tallies the articles in sequence either with automatic tally equipment as shown or with a conventional manual cash register and after doing so sets the tallied articles, indicated generally as 24 onto the loading station 26 of the packaging machine 12. When a suitably sized grouping of the tallied grocery store articles has been accumulated at the loading station 26, the attendant 14 momentarily manually actuates a start button 28 which is accessible on a control panel 29.

Upon this momentary actuation, the packaging machine 12, which is the subject of the present invention, automatically draws the tallied articles 24, which have been stacked at the loading zone, into the machine. It automatically wraps the articles and dispenses wrapped packages onto an exit package retaining station 30. The customer may then proceed to the retaining station 30 and withdraw the packages for carrying from the grocery store.

The packaging machine 12 is, for purposes of safety, cleanliness and appearance, mounted in a suitable cabinet which includes side panels 32 and 34 and top 36. However, in all the subsequent drawings the cabinet panels are removed and additionally in FIGS. 2–4 the support frame is not shown for clarity.

The entire packaging machine is mounted to a suitable support frame 38 preferably constructed from tubular steel of rectangular cross-section and welded to form butt joints at intersecting frame members.

As seen in FIG. 1, the loading station 26 is protectively surrounded by a horizontal, stationary platform 39. The platform 39 however, has an opening 41 which defines both lateral boundaries and the forward longitudinal boundary of the loading station 26. The frame and cabinet are formed so that there are no obstructions above or in front of the loading station 26 to facilitate the placement of articles at the loading station.

Figure 2:
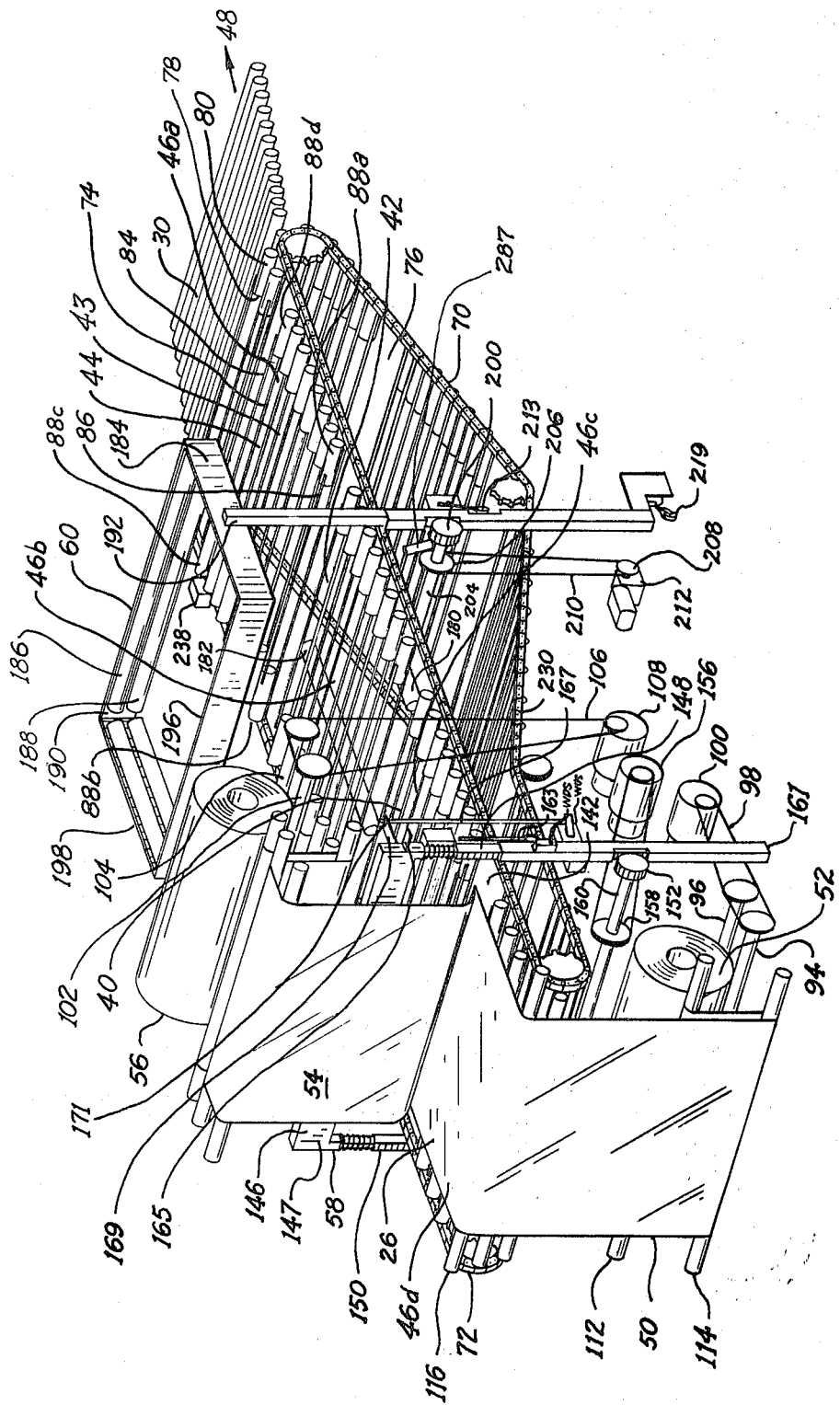
FIG. 2 is a view in perspective of the operating mechanisms of the preferred embodiment of the invention.

Referring now to FIG. 2, for a general description of the packaging machine mechanisms, the unobstructed loading station 26 is formed above the opening 41 in the platform 39 which is not visible in FIG. 2. An endless conveyor 44 is operatively mounted within the support frame. This conveyor 44 is formed with an endless series of loading zones such as loading sections 46A, 46B and 46C which are sequentially positionable in horizontal operable alignment beneath the loading station 26 by advancement of the conveyor 44. The conveyor 44 is drivingly advanceable in discrete loading zone increments in a downstream direction 48 along the bottom of a treatment passageway which is formed in the support frame 38. This treatment passageway extends downstream from the loading station 26 for conveyance of the grocery articles during treatment. Downstream from the loading station 26 along the treatment passageway are in order a welding station 40, a heat shrink station 42, a cooling station 43 and finally an exit package retaining station 30.

Also mounted to the support frame 38 is a film feed means for feeding a first, heat shrinkable film ribbon 50 from a supply roll 52 horizontally and loosely onto the conveyor 44 in a feeding direction past the loading station 26. The film feed means also feeds a second, heat shrinkable film ribbon 54 from a supply roll 56 downwardly and in unobstructive avoidance of the loading station 26 to the first film ribbon 50. These film ribbons 50 and 54 meet adjacent the downstream boundary of the loading station 26. The film feed means and in particular the rolls 52 and 56 are responsive and feed film whenever the film is anchored to the conveyor 44 by grocery store articles and is pulled by advancement of the conveyor.

A transverse welding and severing means indicated generally as 58 is mounted at the downstream side of the loading station 26 and at the upstream boundary of the welding station 40. Its function is to laterally bond the second film ribbon 54 to the first film ribbon 50 intermediate the particular loading zone of the conveyor which is positioned at the loading station 26 and the loading zone 46C of the conveyor which is positioned at the welding station 40 and for also severing the ribbon intermediate such a bond.

Further downstream along the article treating passageway is a heat shrink station 42 at which a heat shrink means 60 is mounted. Preferably, the heat shrink station 42 is immediately downstream of the welding station 40 and operates to heat and shrink film which is loosely wrapped around the articles and positioned at the shrink station 42.

Downstream of the shrink station 42 is a cooling station 43. It is simply a region protectively separated from customers by a portion of the cabinet but adjacent the exit to permit cooling of the heated package during an operating cycle prior to its exit onto the package retaining station 30.

Control means is provided for advancing the conveyor 44 an increment of one loading zone in response to a momentary manual actuation of the start button 28 illustrated in FIG. 1. The control means also controls the operation of the welding and severing means 58 and the operation of the heat shrink means 60 as subsequently described below.

Figure 3:
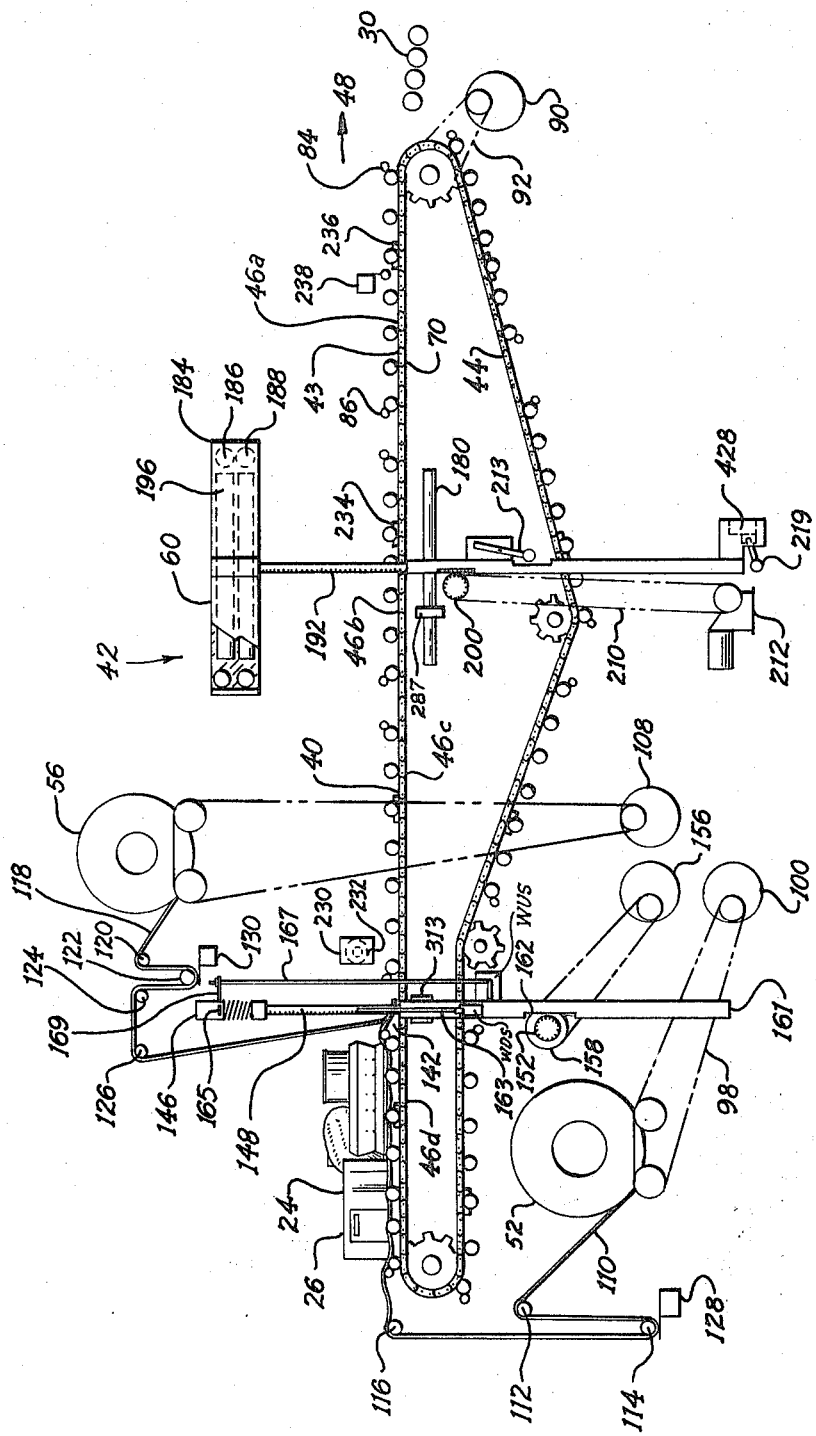
FIG. 3 is a diagrammatic view in side elevation of the working mechanisms of the preferred embodiment of the invention.
Figure 4:
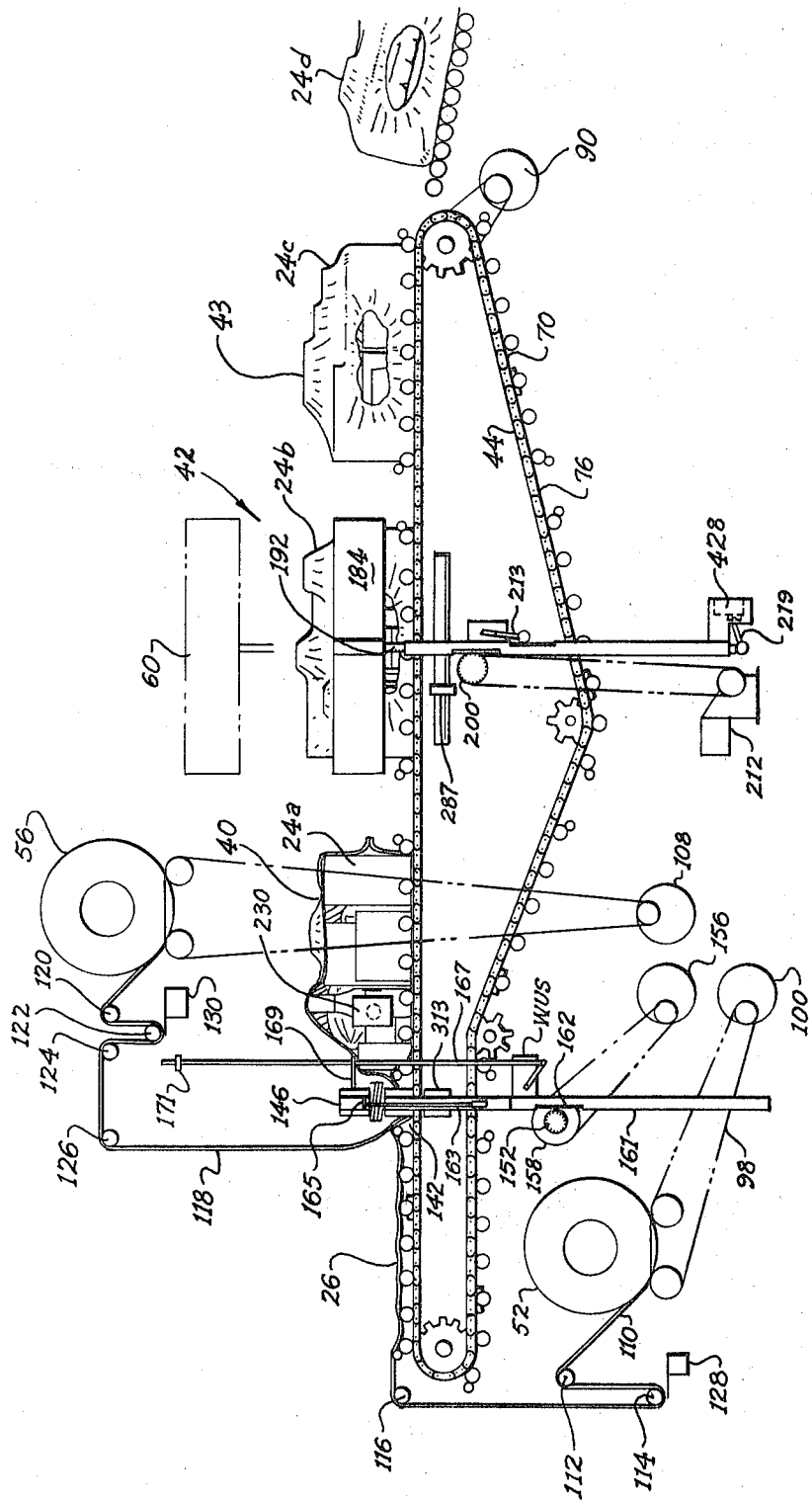
FIG. 4 is a diagrammatic view in side elevation illustrating the operation of the preferred embodiment of the invention.
Figure 5:
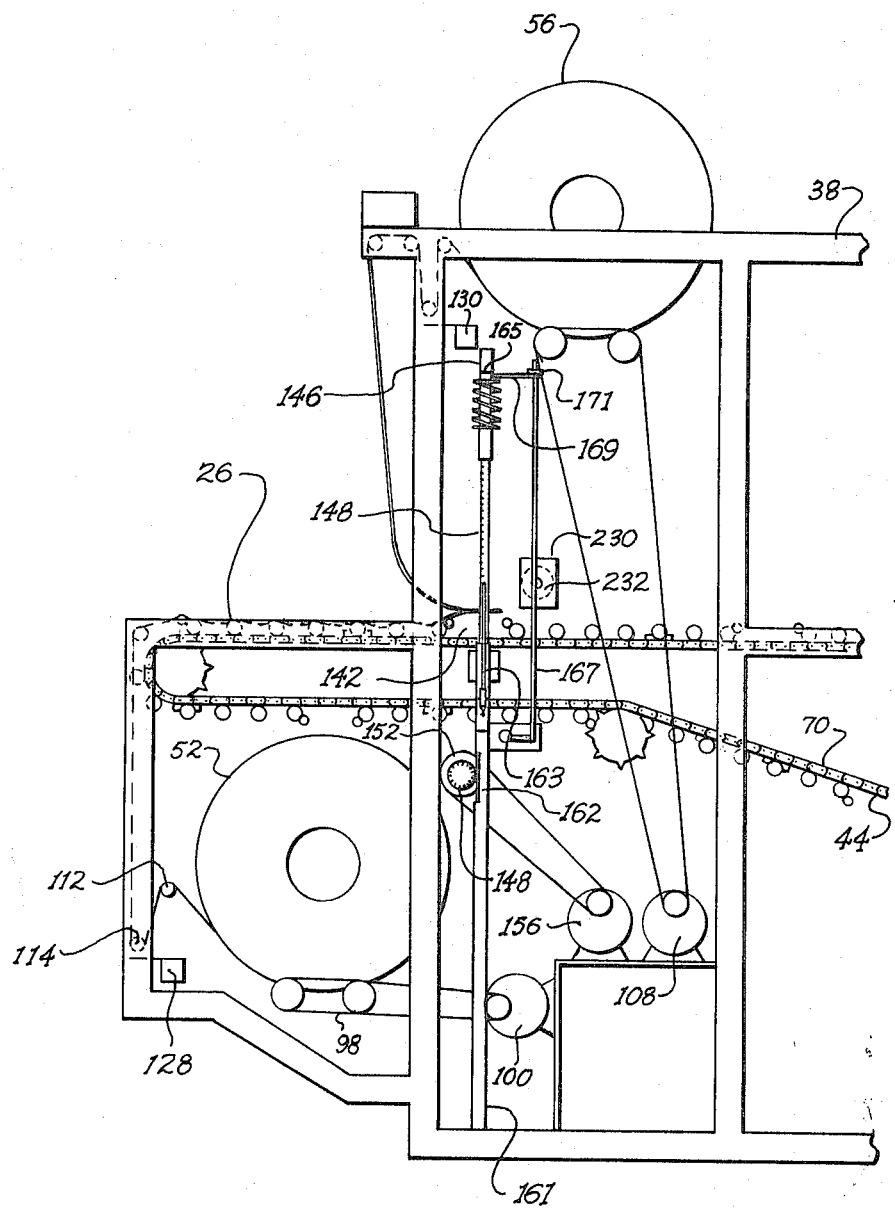
FIG. 5 is a view in side elevation of the loading and welding station portions of the preferred embodiment of the invention.
Figure 6:
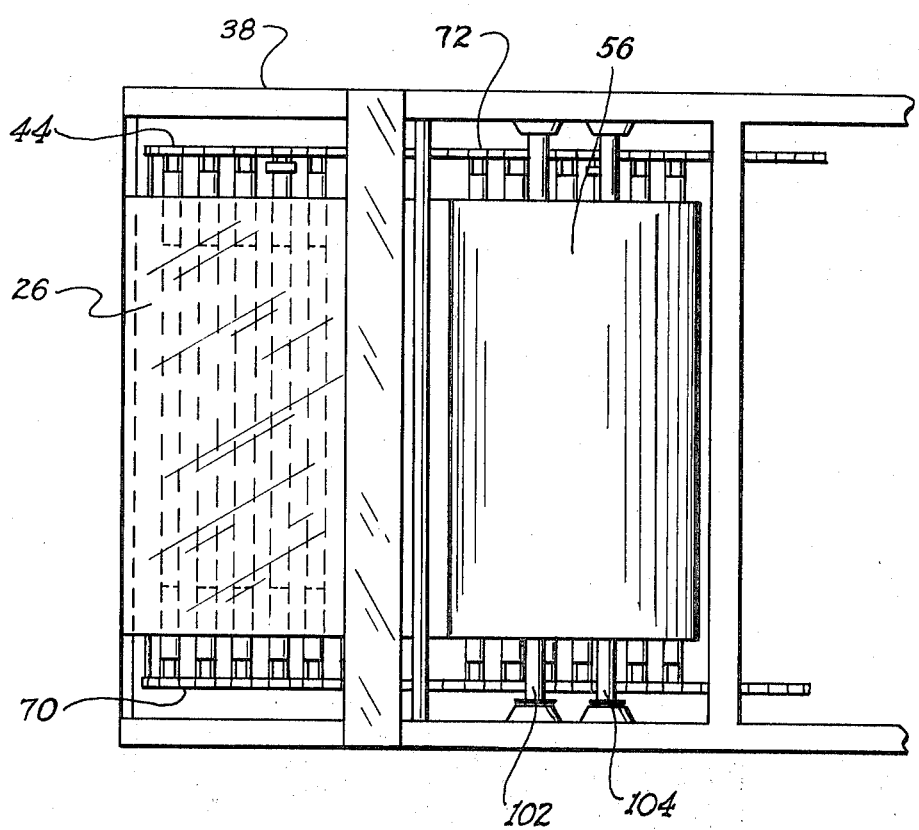
FIG. 6 is a plan view of the same portion of the embodiment of the invention illustrated in FIG. 5.
Figure 7:
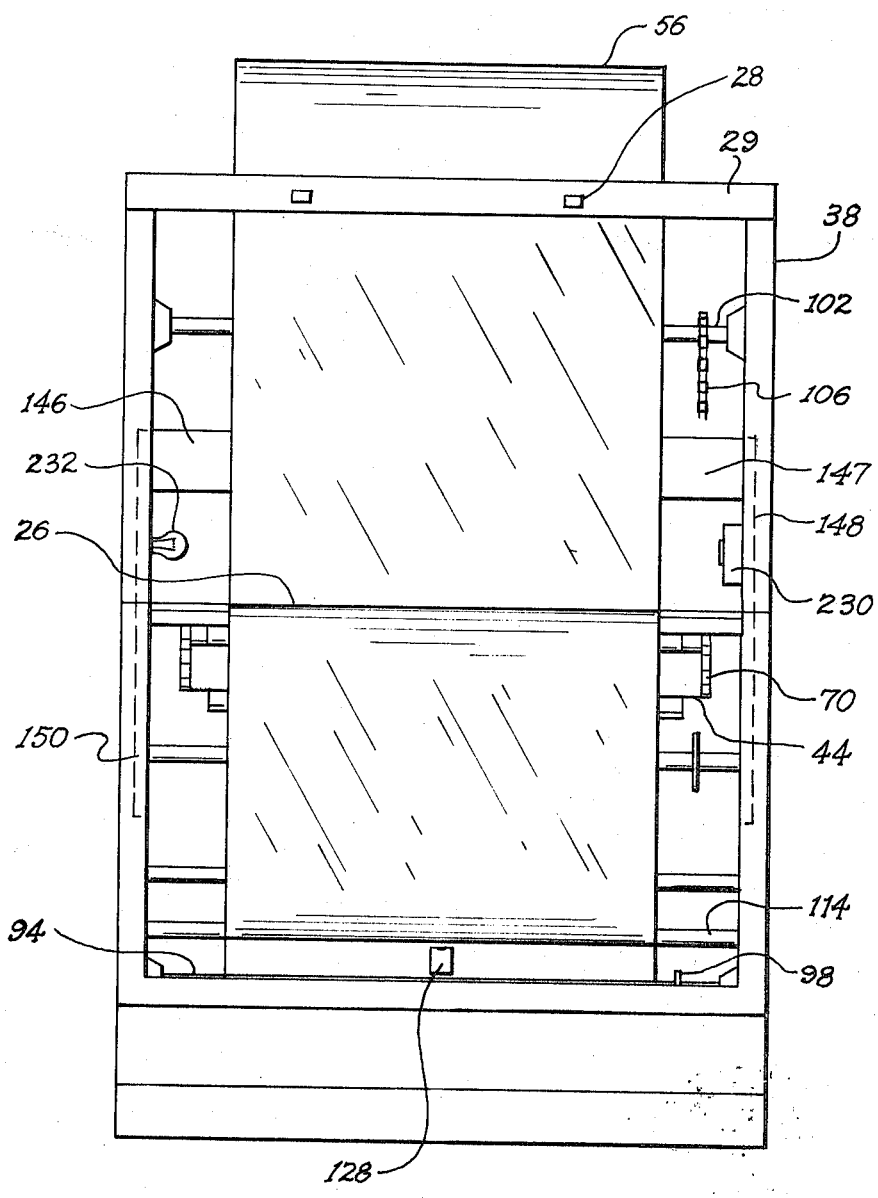
FIG. 7 is an end view of the same portion of the embodiment of the invention illustrated in FIG. 5.
Figure 8:
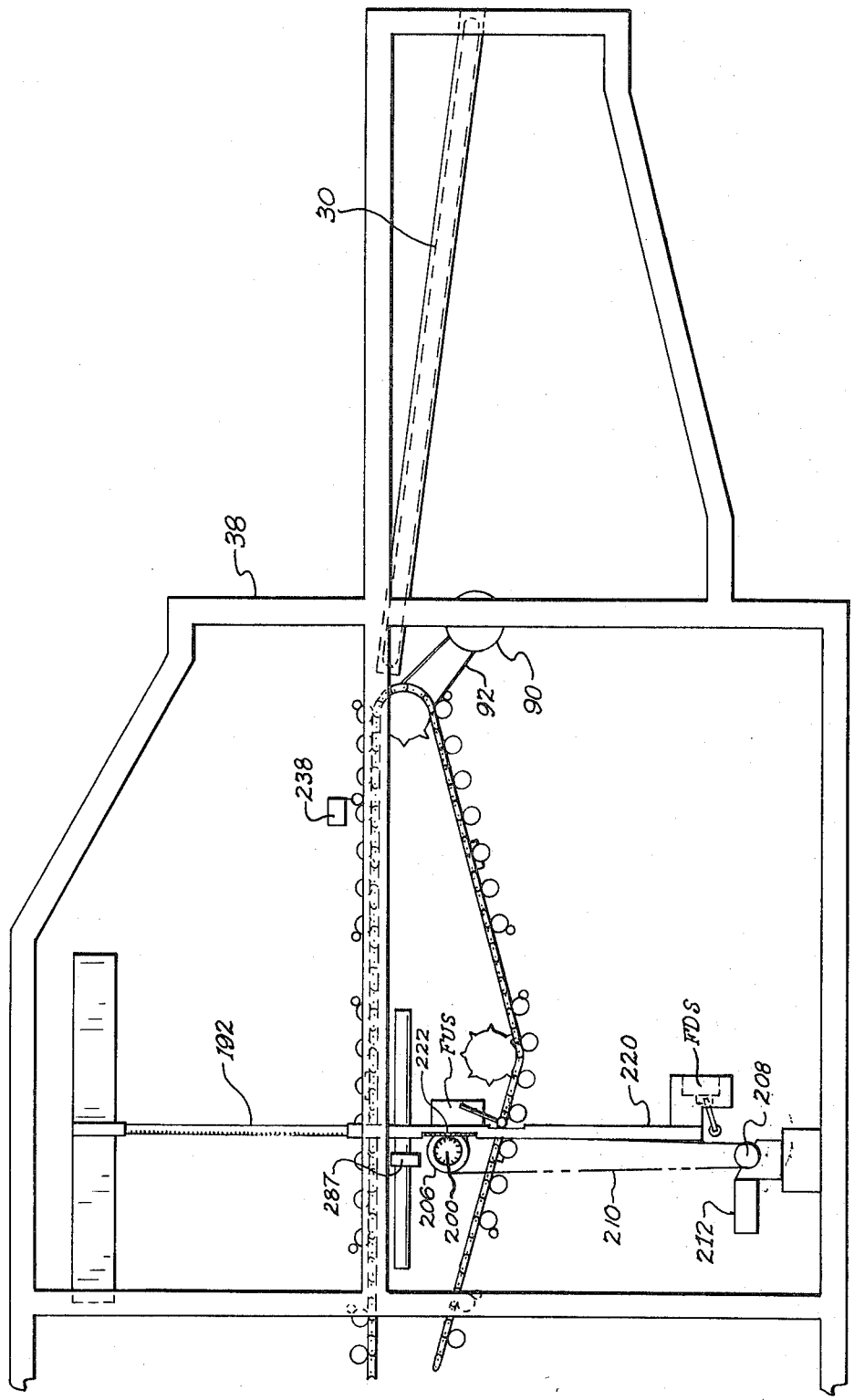
FIG. 8 is a view in side elevation of the remaining portion of the preferred embodiment of the invention including the shrink station and the exit package retaining station.
Figure 9:
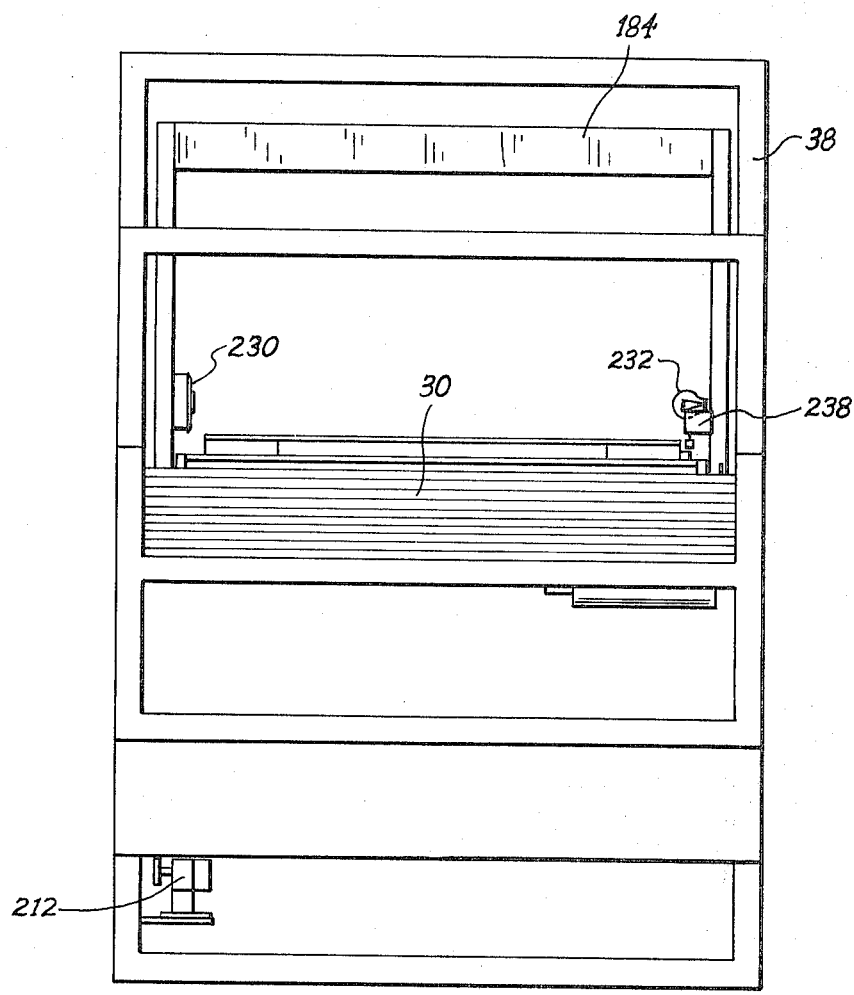
FIG. 9 is an end view of the same portion of the preferred embodiment of the invention illustrated in FIG. 8.
Figure 10:
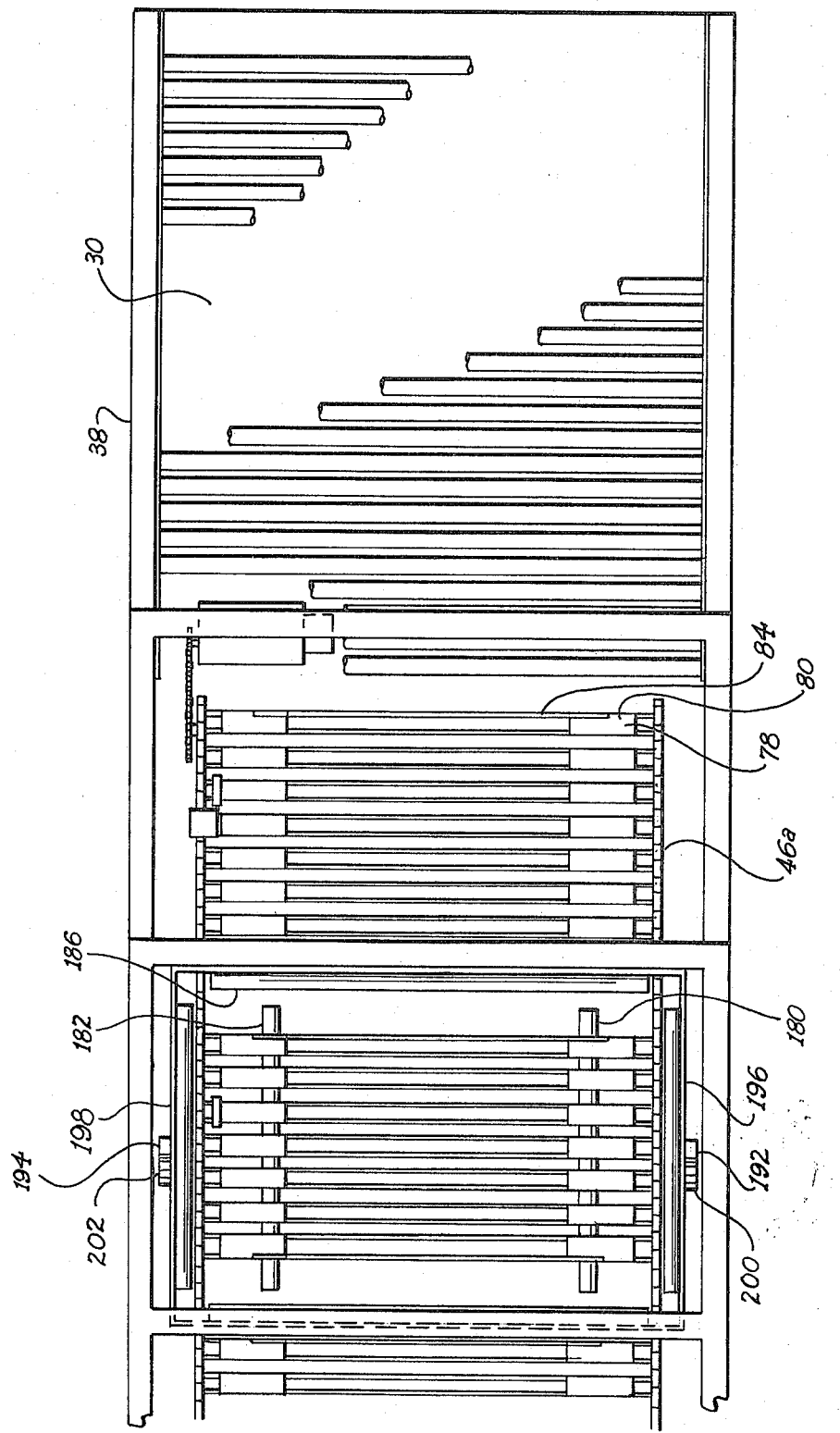
FIG. 10 is a top plan view of the same portion of the preferred embodiment of the invention illustrated in FIG. 8.

The apparatus of the invention can now be described in more detail. For convenience, FIGS. 2–4 illustrate the entire packaging machine while FIGS. 5–7 are devoted primarily to the loading station and the welding station and FIGS. 8, 9 and 10 illustrate the heat shrink station and the retaining station 30.

The conveyer 44 comprises a pair of spaced, parallel, synchronously driven drive chains 70 and 72. A plurality of steel rods, such as rod 74, laterally join these drive chains 70 and 72. The rods are mounted between opposite pivot pins of the links in the drive chains 70 and 72. Contiguous groupings of these rods form the loading zones such as loading zones 46A, 46B and 46C which are separated by intermediate gaps, such as gap 76, which are devoid of such lateral rods. These loading zones move along the treatment passageway and carry articles in serial sequence to the various treatment stations.

Each loading zone, such as the loading zone 46A is preferably bounded by a peripheral fence which comprises outwardly extending lateral rails and outwardly extending longitudinally aligned segmental shoulders which are spaced inwardly from the sides of the conveyer. In the preferred embodiment, the longitudinal, segmental shoulders are formed by the longitudinally aligned inner ends, such as the end 78, of a plurality of tubes, such as tube 80. These tubes are welded parallel to adjacent pairs of the lateral rods. As will be seen, the tubes not only confine the grocery articles to the loading zone but additionally provide conveyer support for the heat shrinkable wrapping film prior to the heat shrink process. Without them, the film would tend, prior to being shrunk, to overlap or hang over the lateral edges of the conveyer 44 and become caught in the working mechanisms or improperly shrunk.

The laterally aligned portions of the peripheral fence which surrounds each loading zone comprises lateral fence rods mounted outwardly of the conveyer and welded on the upper side of the longitudinally aligned tubes. For example, this structure may be seen most clearly with reference to FIGS. 2, 3 and 10. Loading zones 46A has its lateral end fence portions formed by lateral rods 84 and 86 which are welded to tubes 88A, 88B, 88C and 88D and extend laterally across the loading zone. Consequently, these lateral fence rods are alignable in near registration with the forward and rearward boundaries of the loading station 26 and the entire peripheral fence conveniently defines the region in which the attendant 14 positions the articles to be packaged.

The conveyer 44 is driven by a suitable drive motor 90 which is drivingly connected by a drive chain, V-belt or similar suitable means 92 to the sprocket wheel or pulley at the rearward end of the conveyer 44. This driving motor 90 is of course actuated by the control means as described below.

The film feed means is provided to feed ribbons of packaging film from a first supply roll 52 mounted beneath the conveyer 44 and from a second supply roll 56 mounted above the conveyer 44. The first supply roll 52 rests upon a pair of driven rolls 94 and 96 which are driven through a suitable drive chain 98 by an electric motor 100. Actuation of the motor 100 rotates the rolls 94 and 96 which in turn rotate the supply roll 52 for feeding film.

The second supply roll 56 rests upon a pair of similar rolls 102 and 104 which are motor driven through a suitable drive chain 106 by an electric motor 108. This motor when actuated similarly rotates the supply roll 56 for feeding film.

As seen most clearly in FIG. 3, a ribbon 110 of film is fed from the first film supply roll 52 over the top of an idle roll 112, beneath a dancer roll 114, over the top of the second idle roll 116 and then loosely across the top of the conveyer beneath the loading zone 26 to at least the downstream side of the loading station 26. In a similar manner, a film ribbon 118 is fed from the second film supply roll 56 above an idle roll 120, beneath a second dancer roll 122, over further idle rolls 124 and 126 and downwardly in unobstructive avoidance of the loading station 26. This film ribbon 118 joins the film ribbon 110 from the lower supply roll 52 at the downstream edge side of the loading station 26.

Each of the dancer rolls 114 and 122 have their ends extending into oppositely facing u-shaped channels which are vertically aligned so that these dancer rolls are free to move reciprocatingly in a vertical path. Each dancer roll rests upon the switch arm of cooperating microswitches 128 and 130 which are actuated whenever their cooperating dancer roll is raised from its switch arm. Actuation of the switch 128 energizes the feed motor 100 to unwind the lower roll 52. Actuation of the microswitch 130 similarly actuates the motor 108 to feed film from the upper feed roll 56. Consequently, whenever the conveyer is advanced and pulls the film along the conveyer, the dancer rolls 114 and 122 are lifted from the microswitches thus energizing the feeding drive motors 108 and 100. Of course all the idle rolls and the driven rolls are suitably journalled in bearings mounted on the frame but which are not shown for purposes of clarity.

Briefly described, the welding and severing means comprises a pair of heating and bumper members one of which is movable relative to the other. They are mounted on the upstream side of the welding station in registration with the gap between adjacent loading zones. Upon energization by the control means, the movable member descends toward the fixed member through the gap and intermediately grips the overlapping film ribbons and heats them as they lie interposed between these members. Suitable welding and severing means for purposes of this invention have been shown in the prior art for example in U.S. Pat. Nos. 3,289,386; 3,653,177 or 3,564,810.

Such welding and severing means may include linear heating elements, such as wires which are covered with a suitable Teflon protective cover. Upon being heated, they weld the film ribbons which are interposed between the pair of heating and bumper members. Severing may similarly be performed by mounting a third linear heating wire on one of the members and heating it at the appropriate time. Preferably, such a linear heater will be mechanically passed through the ribbons to sever them. All these heating elements or other welding and severing devices can be mounted in various alternative arrangements on either the movable member or the stationary member.

Microswitches are used to detect, for the control means, when the cross beam 147 is at the upper and lower limits of its desired reciprocation. A weld down switch WDS is mounted on the vertical rack receiving tube 161 and is provided with an upwardly extending actuation rod 163. A horizontally protruding finger 165 depresses the rod 163 to actuate the weld down switch WDS when the movable welding and severing beam 146 arrives at its proper descended position. Similarly, a weld up siwtch WUS is linked to an actuation rod 167 which slidably passes through a hole in a horizontally extending arm 169. A nut 171 is fixed to the rod 167 above the arm 169 so that the rod 167 is lifted to actuate the weld up switch WUS when the weld beam 146 rises to its proper uppermost position. Thus, when the cross beam 147 is at the top of its reciprocation, the weld up switch WUS is actuated and when it is at the lower limit of its reciprocation, the weld down switch WDS is similarly actuated. The heating elements utilized in the welding and severing means are suitably connected through lead wires not shown to the control means which is described below.

Referring now to FIGS. 2-4 and 8-10, the loading zone 46B is illustrated in FIG. 2 as centered in the shrink station 42. The shrink means 60 mounted at the shrink station 42 includes a pair of infrared radiation tubes 180 and 182 mounted at the shrink station below the upper loop of the conveyer. Mounted above the shrink station is a rectangular, horizontally aligned, shrink frame forming a carriage 184. A pair of infrared radiating tubes are mounted on each inner side wall of each side of the carriage 184. For example, the radiators 186 and 188 are mounted on the inner rear side 190 of the carriage 184. A pair of vertical rack members 192 and 194 are fixedly mounted to laterally opposite sides 196 and 198 of the shrink carriage 184. These racks 192 and 194 extend downwardly on opposite sides of the article treating passageway and into driving engagement with motor driven pinions 200 and 202.

The pinions 200 and 202 are fixed to a drive shaft 204 which is driven by an electric motor 212 through sprockets 206 and 208 and cooperating drive chain 210.

As shown most clearly in FIG. 8, each of the vertical racks 192 and 194 are slidably engaged in a mating rectangular, tubular member such as tubular member 220 which has a cut out 222 to permit access of the pinion 200 to driving engagement with the vertical rack member 192.

Switches are also used in association with the shrink frame carriage 184 for detecting the extreme upper and lower limits of the reciprocation of the shrink frame. A frame down switch FDS and a frame up switch FUS are mounted to the vertical tubular member 220. The frame up switch FUS is provided with a pivotal, spring biased cam follower type actuation arm 213 having access to the smooth side of the rack 192 through a cut out 215 in the tubular member 220. When the lower end of the rack 192 is raised above the pivot arm 213 the arm 213 pivots to actuate the frame up switch FUS. Similarly, the frame down switch FDS has a pivot arm 219 which is pivoted downwardly to actuate the switch FDS, when depressed by the bottom of rack 192. Thus, the frame up switch FUS is actuated when the frame 184 is at the top of its ascent and the frame down switch FDS is actuated when the frame is at the bottom of its descent.

The infrared radiators are connected by suitable lead wires (not shown) to the control means and by the control means to suitable power supplies. When energized by the control means, the lower infrared radiators 180 and 182 radiate heat energy upwardly through the conveyer between the rods connecting the opposite drive chains 70 and 72 thereof. Similarly, the carriage mounted infrared radiators radiate heat energy as the carriage descends and as it ascends around a package positioned at the shrink station. The heat causes the package to shrink in the known manner.

The control means may be provided with a dwell timer so that the shrink carriage 184 will dwell for a selected time interval at the lower limit of its descent. We have found that this substantially enhances the quality of resultant package. Similarly, the control means desirably also employs a timing means for controlling the heating time and dwell at the bottom for the welding and severing means as described below.

We have found that a radiation responsive temperature detector 287 of the type using a photo-resistor or photo-diode for example, can advantageously be used to detect the temperature of the infrared radiating tubes used at the shrink station. For example, the control means may initiate energization of the infrared radiating tubes at the beginning of the descent of the shrink frame 184.

However, the shrink frame 184 will be automatically held at the bottom of its descent at least until the infrared radiating tubes have attained a selected temperature such as, for example 1,800°F. A timer may be used in conjunction with the temperature sensor to delay the bottom dwell a selected time after the infrared tubes reach the selected temperature.

Such operation in effect extends the bottom dwell time to permit warm up of cold infrared tubes but shortens the dwell when the infrared rubes are already in a partially heated condition when energized. Consequently, both continuous and intermittant operation are accommodated.

Additionally, we found it advantageous to include a photo-electric cell detecting means including a photo-detector 230 and an associated light source 232. These are mounted at the weld station 40 to detect the presence or absence of articles on the loading zone 46C positioned in FIG. 2 at the welding station 40. This photo-electric detector 230 determines whether articles are present at the weld station so that the welding and severing means should be actuated and also determines whether shrink means 60 should be actuated after the conveyer 44 is advanced one loading zone increment. Its operation is further described below.

Finally, a series of small cams, which protrude outwardly, are connected to the conveyer drive chain 72. Each such cam, such as the cams 234 and 236, are associated with a single loading zone on the conveyer. Each cam is identically positioned relative to its associated loading zone and operates to actuate a cam follower switch 238 which is mounted to the support frame rearwardly of the shrink station 42. As described below, this cam follower operated switch 238 detects the positioning of the conveyer and cooperates as a part of the control means. It assures that the conveyer is advanced precisely in single loading zone increments in response to the actuation of the start button 28.

The exit storage area or package retaining station 30 receives the packaged articles. It is simply a plurality of freely rotatable, idle rolls which are aligned along a downwardly inclined path so that packages may slide by gravity to the rearward end of the packaging machine to await being carried from the grocery store.

MECHANICAL OPERATION

The operation of the preferred embodiment illustrated in the drawings may be described with particular reference to FIGS. 3 and 4. The attendant places the individual grocery articles in the loading station 26 by positioning them on the film ribbon 110 which lays upon the conveyer at the loading zone 46D. When the attendant is satisfied that the loading station 26 is sufficiently filled with tallied grocery articles, she momentarily depresses the start button 28 illustrated in FIG. 1. The remainder of the mechanical operation is automatic and is controlled by the control means discussed below. The conveyer immediately advances one loading zone increment in a downstream direction 48. Referring to FIG. 3, the conveyer advances until the cam follower switch 238 has ridden over the cam 234 and is released by the cam 234. The conveyer halts upon such release.

The loading zone 46D is transferred to the welding station 40. Because the grocery articles anchor the film ribbons 110 and 118 to the conveyer, this conveyer movement pulls on the film ribbons 110 and 118. The initial pull lifts the dancer rolls 114 and 122 from their cooperating switches 128 and 130 thus energizing the film feed drive motors 110 and 108. Consequently, film is metered from the film feed rolls 52 and 56 until the conveyer ceases its advance and the dancer rolls 114 and 122 settle back down upon their switches 128 and 130 to deenergize their associated drive motors 100 and 108. In this manner, the grocery articles 24 are moved to the position 24A shown in FIG. 4 with the upper film ribbon 118 drawn over the top of the articles 24A.

As soon as the conveyer stops advancing, a new loading zone is presented at the loading station 26 and the attendant may immediately begin to refill the loading station for the next package. There is no need to wait for subsequent operations to be completed.

Simultaneously, the control circuit senses, by means of the photo-electric detector 230, that a package is present at the welding station 40.

With the package 24A present at the welding station 40, the control means energizes motor 156 thereby rotating pinion 152 and lowering rack 148. This lowers the cross beam 147 and any associated heating elements. As the cross beam 147 begins its descent, the weld up switch WUS is initially released. The cross beam 147 continues to descend until it extends through the gap between the loading zones at the loading station and at the weld station and finally the weld down switch WDS is operated. The weld down switch is positioned so that it is operated when the heating elements are properly positioned with the film ribbons intermediately gripped between the movable welding and severing member and the stationary welding and severing member 313.

The control circuit, upon actuation of the weld down switch WDS deenergizes the motor 156. It also energizes the heating elements and timers which control the length of time that the motor 156 is deenergized and that the welding and severing heating elements are energized. After a selected time delay, these heating elements are deenergized and after a further delay, the motor 156 is again energized but in a reverse direction so that it begins raising the rack members 148 and 150. The rack members continue to be raised until the weld up switch WUS is actuated which causes the control means to again deenergize the weld bar driving motor 156.

The heating means in the weld beam 147 heats the thermoplastic film ribbons and bonds them together. Simultaneously, the film ribbon around articles 24A is severed from feed ribbons 110 and 118 intermediate the welded bond. The film in the packaged articles 24A, however, limply lays upon them at this stage.

When the attendant initially depressed the start button 28 the photoelectric detector determined that no package was present at the weld station 40. The control means therefore inhibited the operation of the shrink means 60 during the succeeding cycle of operation. Consequently, if the package 24A is the first package fed into the packaging machine then the machine will cease operating after the weld and sever operation until the attendant again depresses the start button 28.

When the attendant has refilled the loading station 26, she again depresses the start button 28. The photoelectric detector 230 immediately detects the package 24A on its way to the shrink station 42. The cycle proceeds at the weld station 40 identically as described above. The conveyer is again initially advanced one loading zone increment and then stopped. The weld operation then proceeds. Simultaneously, the shrink means 60 will now begin operation immediately after the conveyer stops. The shrink frame drive motor 212 is energized to rotate the pinion 200 and lower the shrink frame 184. The frame up switch FUS is immediately released and the shrink frame 184 continues to descend until the frame switch is actuated by the rack 192.

All of the infrared radiating tubes, such as the lower tubes 180 and 182 and the tubes in the shrink frame, for example tubes 186 and 188, may be energized according to a desired, empirically proven, timing cycle. For example, they may be energized immediately upon the beginning of the descent of the shrink frame 184 and may continue until the frame has returned to its raised position.

As the shrink frame 184 begins to descend, it surrounds the package, now positioned at 24B, and heats the thermoplastic heat shrinkable film causing it to shrink tightly around the grocery articles. Simultaneously, the lower infrared tubes 180 and 182 rdiate heat upwardly at the package for the same purpose.

When the shrink frame 184 reaches the bottom of its descent and actuates the frame down switch FDS, the control means deenergizes the drive motor 212 and actuates a timing means which determines the time interval the shrink frame will remain in its lower position. Alternatively, the package temperature or preferably the tube temperature is sensed by a radiation responsive detector. After the desired time interval or after a suitable temperature is reached or both, the drive motor 212 is again energized but in a reverse direction. This reversely rotates the pinion 200 lifting the racks 192 and 194 to lift the shrink frame 184 to its raised position. When the shrink frame 184 reaches the top of its path, the frame up switch FUS is actuated to again deenergize the drive motor 212.

We have experimentally found it advantageous to construct the control means so that the infrared radiating tubes are deenergized shortly after the shrink frame begins to ascend. As explained below a timer operates to accomplish this a selected time after ascent is begun.

This operation not only eliminates the burning of holes in the top of the package but additionally prevents excessive consumption of electrical power and generation of unwanted heat.

These are some of the primary advantages of the shrink structure described above over the conventional heat shrink tunnel. The conventional tunnel is constantly maintained at a suitable shrink temperature. This may be acceptable for a continuous, uninterrupted industrial application. However, its continuous heat generation and power consumption are unacceptable for an intermittent retail sales operation.

When the attendant again refills the loading station 26 she will again depress the starting button 28 and the cycle will be repeated with each package moving one loading zone increment in the downstream direction 48. The packages are ultimately delivered onto the exit storage table or retaining station 30 and slide down the rollers to the end bumper where they are retained until the customer withdraws them and carries them from the store.

It can be seen from the above that one advantage of this packaging machine is that the loading, wrapping and shrinking operations occur serially in three separate operations. All operations may be simultaneously performed on different packages. Consequently, the maximum cycle time necessary is only the cycle time needed for the longest of these three operations. It is not necessary that each cycle be long enough for all three operations to be done to a single package. The result is a greatly increased rate at which grocery store articles can be packaged and consequently at which customers can be serviced.

When the last package in a sequence has been loaded into the loading station 26, the attendant continues to depress the start button 28 after each operation is completed. However, because the film ribbon 110 is laying loosely upon the conveyer 44 at the loading station 26, film will not be drawn into the packaging machine when no packages are present at the loading station 26. The conveyer will merely slip beneath the film ribbon 110.

The welding operation at the weld station 40 and the heat shrinking operation at the heat shrink station 42 will occur only when packages are present at their stations which require their treatment. The photo-electric detector circuit consequently eliminates unnecessary operation of the packaging machine. Thus, the attendant either continues depressing the start button until all the packages for one customer are delivered to the exit retaining station 30 or immediately cotinues the operation by servicing the next customer.

CONTROL MEANS CIRCUIT

Figure 11:
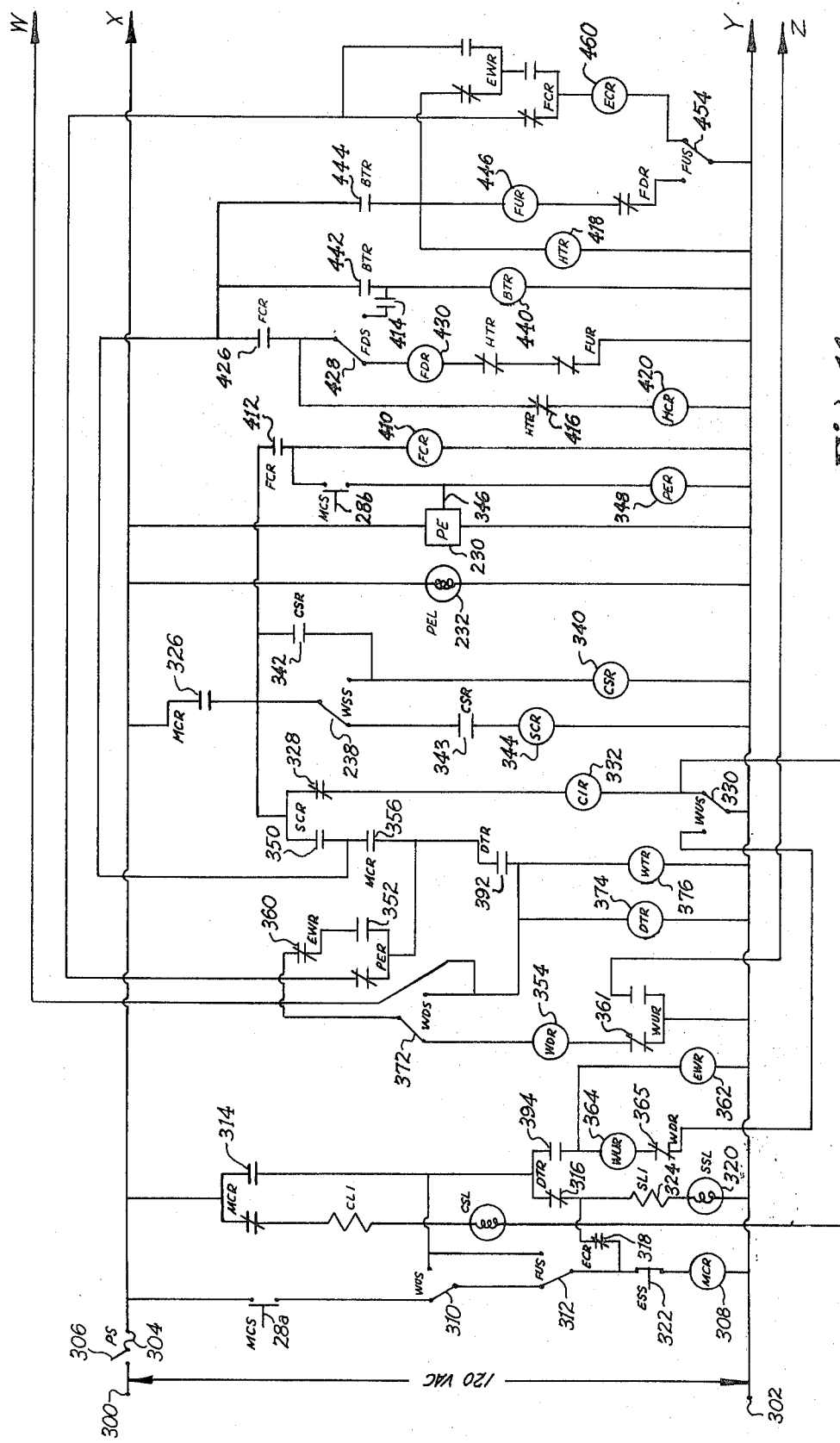
FIG. 11 is a schematic diagram of a portion of the control means circuit for operating the preferred embodiment of the invention.
Figure 12:
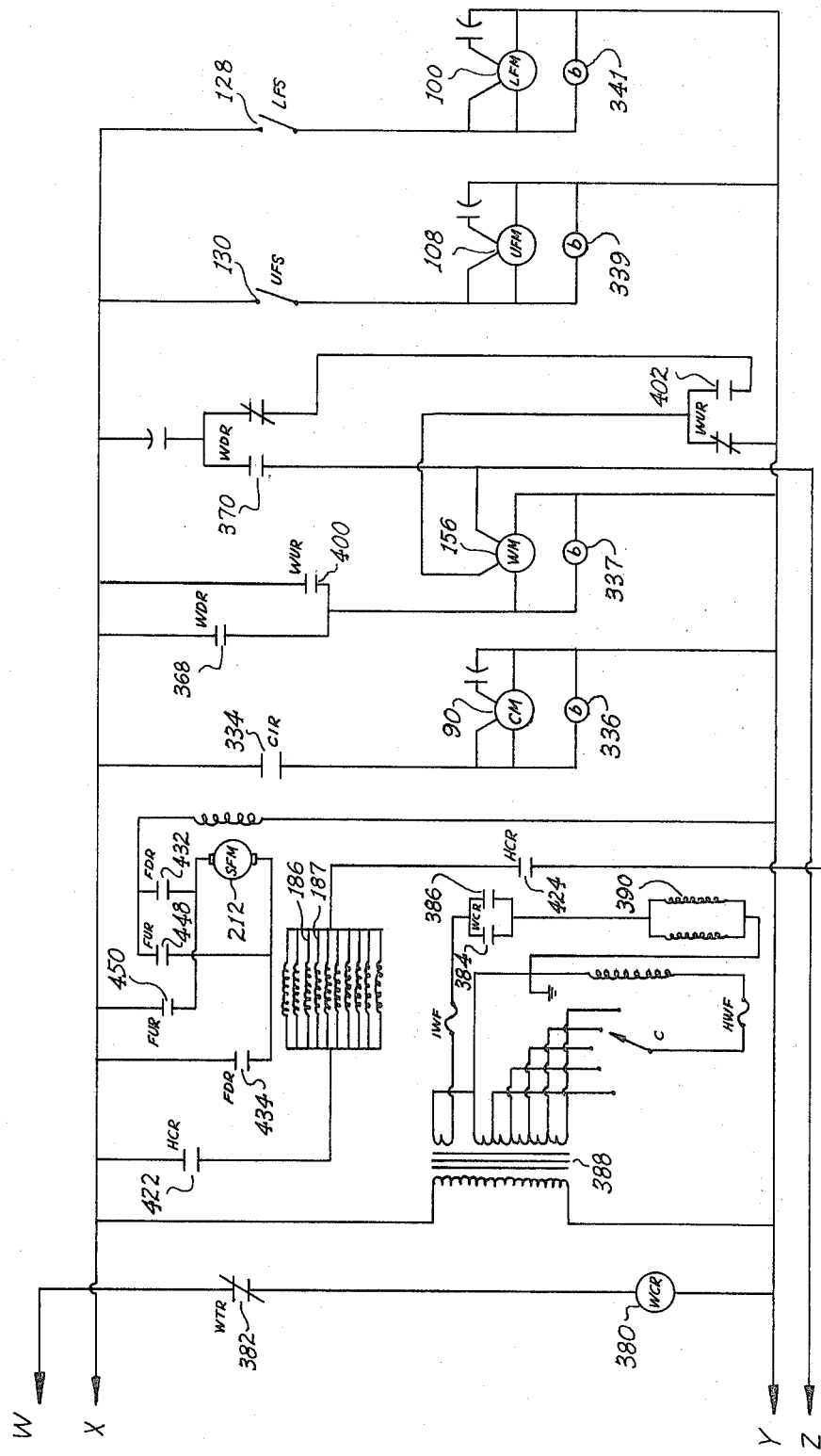
FIG. 12 is a schematic diagram of the remaining portion of the control means circuit for operating the preferred embodiment of the invention.

The circuit diagram for the control means which controls the operation of the above packaging machine is illustrated in FIGS. 11 and 12. The logic, timing, and detecting circuitry is illustrated in FIG. 11 while the motor operating and heating circuitry is illustrated in FIG. 12. These circuits are, however, joined along four leads at W, X, Y and Z.

The abbreviations used in the circuit diagram to indicate the various relays and their associated contacts are defined in the following table.

Many of the relays and switches have multiple sets of contacts all of which have associated therewith the appropriate abbreviations. All contacts have identical abbreviations associated with them are operated by and work simultaneously with the relay coil having the identical associated abbreviations.

ABBREVIATIONS USED ON SCHEMATIC

PE Photo-electric sensor
HWF hot wire fuse (cutting wire)
IWF (WF) impulse weld fuse
CLI Cycle light impedance (green lens)
SLI Stop light impedance (red lens)
CSL Cycle switch light (Green)
SSL Stop switch light (red)
PEL Photo-electric light (source)
LFM Lower film motor
SFM Shrink frame motor
CM Conveyer motor
UFM Upper film motor
WM weld motor
BTR bottom timer relay (shrink frame)
DTR dwell timer relay (movable weld member)
ECR end cycle relay
EWR end weld relay
FCR frame control relay (shrink frame)
FDR frame down relay (shrink frame)
FUR frame up relay (shrink frame)
HTR heater timer relay
LCR lamp control relay (powers infrared radiator tubes)
MCR master cycle relay
PER photo-electric relay
SCR seal cycle relay (slants weld and/or shrink)
CIR conveyer in relay (operates conveyer)
CSR conveyer stop relay (stops conveyer)
WCR weld control relay (powers weld member)
WDR weld down relay
WTR weld timer relay
WUR weld up relay
FDS frame down switch
FUS frame up switch
WDS weld down switch
WUS weld up switch
HWS hot wire switch (T selector)

The switches indicating whether the weld beam and the shrink frame are in their up or down positions, have their appropriate position marked up or down to indicate the switch position when its associated part is in the up or down position. The unmarked side of each of these double throw switches represents that the condition is not up or not down. Thus, for all states except the indicated states, these switches are in their unmarked positions.

Referring now to FIGS. 11 and 12, power is applied to the control means circuit at its inputs 300 and 302. It is suitably fused by a fuse 304 and switched by a main power switch 306 which preferably is accessible to the attendant 14 at the control panel 29 at the front of the packaging machine 12 in FIG. 1. When the attendant momentarily depresses the start button switch 28 to actuate its contacts 28A, a master cycle relay 308 is energized through the weld up switch 310, the frame up switch 312 and the emergency stop switch 322 which is mechanically biased to a closed state.

This momentary energization of the master cycle relay 308 closes its contacts 314 so that it is latched closed by current supplied by through contacts 314 and contacts 316 and 318 of the energized dwell timing relay 374 and the end cycle relay 460. Simultaneously, a stop switch light 320, which is mounted behind and illuminates the emergency stop switch 322 accessible on the control panel 29, is illuminated. The light 320 has a current limiting resistance 324. The light 320 indicates that the machine is cycling and also draws the attendant's attention to the stop button 322 if an emergency situation would arise. As can be seen in FIG. 11, depression of the emergency stop switch 322 immediately deenergizes the master cycle relay 308 bringing all operations to an immediate halt.

Actuation of the master cycle relay 308 also simultaneously closes the contacts 326 of the master cycle relay which apply power through the still closed contacts 328 of the seal control relay 344 and through the weld up switch 330 to the conveyer in relay 332.

The application of power to the conveyer in relay 332 closes contacts 334 (illustrated in FIG. 12) of the conveyer in relay 332. These contacts apply power to the conveyer motor 90 which as shown in FIG. 12 is provided with an internal brake 336. This internal brake 336 as well as the internal brakes on the other motors serves to immediately stop the motor as soon as the motor is deenergized. This prevents the systems inertia from carrying the driven mechanisms past their intended path terminus.

Eventually, a cam on the conveyer 44, such as the cam 234 illustrated in FIG. 3, raises the cam follower at the cam follower switch 238 so that in FIG. 11, the single-pole double throw cam follower switch 238 is switched to its cam up position. This in turn applies power to a conveyer stop relay 340. Actuation of the conveyer stop relay 340 closes its contacts 342 which latch it in an energized condition and simultaneously close its contacts 343. However, the conveyer continues operating because power is still applied to the conveyer in relay 332.

However, as soon as the cam follower switch 238 is passed by the cam 234, its cam follower falls, switching the cam follower switch 238 to its cam down position. This immediately energizes the seal cycle relay 344 which in turn opens the seal cycle relay contacts 328 to deenergize the conveyer in relay 332. The conveyer 44 is thereby stopped from further forward movement after it has been advanced a single loading zone increment.

Articles initially positioned at the loading station anchor the film to the conveyer so that the conveyer movement pulls film from the film supply rolls 52 and 56 as described above. The upper feed motor 108 and the lower feed motor 100 and both equipped with internal brakes 339 and 341 which prevent overfeed and excessive loose film.

The welding and severing means and the heat shrink means will now begin simultaneous operation if appropriate. Their operation is appropriate when articles are present at their station to be treated. They may best be described individually each without reference to the other with the understanding that both operations may be occurring simultaneously.

As previously described, the packaging machine is provided at the welding station 40 with a continuous illuminated light source 232 which is directed at a photoelectric detector 230. The photoelectric detector 230 is a conventional item which may be purchased. For purposes of the present application it is sufficient to indicate that its output 346 is effectively connected to the potential of the input power terminal 300 when light from the light source 232 is blocked from striking the photoelectric detector 230. When light from the light source 230 is incident upon the photo-electric detector 230, the detector's output 346 is at substantially the potential of the power input terminal 302. The output 346 of the photo-electric detector is connected to operate a photo-electric relay 348

Therefore it can be seen that when the cam follower switch 238 closes, it energizes the seal cycle relay 344. This causes the seal cycle relay contacts 350 to close. If articles are present at the weld station 40, the photoelectric relay 348 will be energized to close photoelectric relay contacts 352. In this manner, power may now be applied to a weld down relay 354 through contacts 326 of the master control relay 308, terminals 350 of the seal cycle relay 344, terminals 356 of the master cycle relay 308, terminals 352 of the photoelectric relay 348 and through the closed terminals 360 and 361 of the end weld relay 362 and the weld up relay 364.

Energization of the weld down relay 354 in this manner closes the contacts 368 and 370 in FIG. 12 to apply power to the weld drive motor 156 driving it in a direction which lowers the movable weld member 147.

The motor 156 continues driving the weld bar in a downward direction until the weld down switch 372 switches to its down position. Such movement of the weld down switch 372 immediately deenergizes the weld down relay 354 cutting power from the weld motor 156. Its internal brake 337 then immediately stops further travel. Simultaneously, this movement of the weld down switch 372 applies power to the dwell timer relay 374 and the weld timer relay 376.

The operation of the dwell timer relay 374 and the weld timer relay 376 and in fact the operation of all the timer relays in the present circuit is conventional. A selected time interval after the timing relay is energized, contacts are actuated. Thus, a timer relay is initially energized but does nothing. After a selected time interval, it changes states and remains in the changed state until power is removed from its input.

Therefore, movement of the weld down switch 372 to its down position not only initiates the operation of the dwell timer relay 374 and the weld timer relay 376 but simultaneously applies power to the weld control relay 380 in FIG. 12 through normally closed contacts 382 of the weld timer relay 376. Energization of the weld control relay 380 of FIG. 12 causes immediate closure of its contacts 384 and 386 to apply power from the transformer 388 to the heating members 390 of the welding and severing means.

A first time interval after initial actuation of the weld time relay 376, it is switched to open its contacts 382 thereby deenergizing weld control relay 380 and in turn opening contacts 384 and 386 to quench the heating of the heating members 390.

The dwell timer relay 374 is set to a longer time interval to permit the welded and severed film to cool adequately. Subsequently, however, the dwell timer relay 374 also is actuated by its internal timing mechanism closing its contacts 392 and its contacts 394.

Closure of contacts 394 applies power to the weld up relay 364 through contacts 365 of the weld down relay 354 and the weld up switch 330. When the weld up relay 364 is operated, its contacts 400 and 402 are closed thereby applying power to the weld motor 156 in an opposite direction to drive the weld bar 147 upwardly. When the weld bar 147 reaches the top of its ascent, the weld up switch 330 returns to its up position this deenergizing the weld up relay 364 and therefore in turn deenergizing the weld motor 156.

The contacts 310 of the weld up switch insure not only that initial power in the beginning of operation can be applied to the master cycle relay 308 only when the movable weld member is in the up position but also maintains a supply of power to the master cycle relay 308 after the dwell timer relay contacts 316 are opened. Consequently, if the frame up switch 312 has not been actuated, for example the frame was not operated because a package was not present to be shrunk, then return of the weld up switch 310 to its up position immediately deenergizes the master cycle relay 308 returning the entire machine to its initial state ready for another cycle of operation.

If however, we assume that while the weld station mechanism was being utilized, the heat shrink mechanism was also being utilized we must turn then to a consideration of the operation of the heat shrink means.

The start button 28 is a double pole single throw button having parts 28A and 28B. When this start button 28 is initially momentarily depressed, its contacts 28B will momentarily apply to a shrink frame control relay 410 the potential of the output 346 of the photoelectric detector. If during this instant no articles are present at the weld station intermediate the photoelectric detector 230 and its light source 232, then the frame control relay 410 will not be actuated and the heat shrink means will not be operated. However, if articles are then present at the weld station, the frame control relay 410 will be actuated and its contacts 412 will close to latch the frame control relay 410 in an energized condition during the remainder of the machine cycle.

It may be remembered also that the seal cycle relay 344 was energized as the cam follower switch 238 fell down the opposite side of a cam such as cam 234. When the conveyer is thereby stopped, and the seal cycle relay 344 thereby energized, its contacts 350 are closed to apply power through contacts 426 of the frame control relay 410 and through the normally closed contacts 416 of a heat timer relay 418 to a heat control relay 420. This energization of the heat control relay 420 closes its contacts 422 and 424 in FIG. 12 to apply energy to the infrared heat lamp tubes such as 186 and 187.

Simultaneously, power from output terminal 300 is applied through master cycle relay contacts 326, seal cycle relay contacts 350, frame control relay contacts 426, and the frame down switch 428 to a frame down relay 430. Actuation of the frame down relay 430 closes its contacts 432 and 434 driving the frame down motor 212 so that it lowers the shrink frame 184 as described previously. The shrink frame continues to descend until the frame down switch 428 switches to its down position. This immediately deenergizes the frame down relay 430 stopping the frame drive motor 212.

Contacts 414 are connected to the radiation responsive temperature sensor and are closed by it when the suitable infrared radiator temperature is attained. When the contacts 414 close, this immediately energizes the bottom timer relay 440 which after a selected time period closes its contacts 442 and 444. Closure of contacts 442 continues the supply of power to the bottom timing relay 440 after the shrink frame begins to rise. The closure of contacts 444 applies power to a frame up relay 446. Operation of the frame up relay 446 in turn closes contacts 448 and 450 in FIG. 12 to apply power to the frame drive motor 212 in a reverse direction. The frame is thereby driven toward its uppermost position and continues being driven until the frame up switch 454 switches to its up position.

Closure of contacts 444, which initiated ascent, also applies power to the heat timer relay 418. A selected period of time after being energized, the heat timer relay 418 activates to open its normally closed contacts 416. This deenergizes the heat control relay 420 which in turn opens contacts 422 and 424 in FIG. 12 to deenergize the heating tubes 186, 187 etc.

This movement of the frame up switch 454 prevents the supply of power to the frame up relay 446 thereby opening contacts 448 and 450 in FIG. 12 to stop the frame drive motor 212. Simultaneously, movement of the frame up switch 454 to its up position and also movement of the simultaneously acting frame up switch 312 to its up position will immediately end the cycle and deny power to the master cycle relay 308.

Thus, if the dwell time relay contacts 316 have opened because the weld operation is completed, then movement of the weld up switch 312 to its up position will deny all power to the master cycle relay 308 thus retaining the machine to its initial inoperable condition.

If however, there was no operation of the weld means, then the end cycle relay contacts 318 must be opened by energization of the end cycle relay 460.

This end cycle relay 460 is actuated as soon as the frame up switch 454 returns to its up position. If however, there was neither a weld operation nor a heat shrink operation the end cycle relay 460 will be actuated as soon as the conveyer stops and the seal cycle relay contacts 350 are closed.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

I claim:

1. An apparatus for packaging heterogeneous grocery store articles and the like, comprising:
   a. a support frame having a substantially horizontal opening, forming an unobstructed loading station above said opening and having a treatment passageway extending downstream from said opening for conveyance of said articles;
   b. an endless conveyer mounted on said support frame and formed with an endless series of loading sections sequentially positionable in horizontal operable alignment beneath said loading station, said conveyer being drivingly advanceable in discrete loading section increments downstream along the bottom of said passageway;
   c. a film feed means for feeding a first, heat shrinkable film ribbon horizontally and loosely onto said conveyer in a feeding direction past said loading station and for feeding a second, heat shrinkable film ribbon downwardly, in unobstructive avoidance of said loading station, to said first film ribbon adjacent the downstream boundary of the loading station, said film feed means being responsive and feeding film when film anchored to said conveyer by articles is pulled by advancement of said conveyer;

d. transverse welding and severing means mounted at the downstream side of said loading station and at the upstream boundary of a welding station for at times laterally bonding said first film ribbon to said second film ribbon intermediate of loading sections and for severing said ribbons intermediate a bond;

e. a heat shrink means mounted at a shrink station of said passageway at the downstream side of said welding station for heating and shrinking film positioned at said shrink station; and f. control means for advancing said conveyer one loading section in response to a momentary manual actuation and for controlling the operation of said welding and severing means and said heat shrink means.

2. An apparatus according to claim 1 wherein each of said loading sections are bounded by a peripheral fence comprising outwardly extending lateral rails and outwardly extending, longitudinally aligned, segmental shoulders spaced inwardly from the sides of said conveyer.

3. An apparatus according to claim 2 wherein said conveyer comprises a pair of spaced, parallel, synchronously driven drive chains, a plurality of rods mounted between opposite pivot pins of the links of said chain, and wherein said peripheral fence is fixed to said rods.

4. An apparatus according to claim 3 wherein said longitudinal segmental shoulders are formed by longitudinally aligned ends of a plurality of tubes welded parallel to adjacent pairs of said rods.

5. An apparatus according to claim 1 wherein said heat shrink means comprises: an upwardly radiating infrared radiator means mounted below said conveyer at said shrink station; a carriage mounted for descendable reciprocation at said shrink station; and infrared radiator means mounted to said carriage for descending, radiating heat energy onto a package at said shrink station and ascending when said conveyer is immobile.

6. An apparatus according to claim 5 wherein said control means comprises a radiation responsive temperature detector means mounted to said support frame and aimed to detect the temperature of infrared radiator means and is connected for holding said carriage at its descended position at least until a selected temperature is detected.

7. An apparatus according to claim 5 wherein said control means includes switch means for initiating an operating cycle of said heat shrink means and a dwell timer means for controlling the time interval that said carriage dwells at the bottom of its descent.

8. An apparatus according to claim 7 wherein said carriage comprises a rectangular, horizontally aligned shrink frame having infrared radiators mounted on the inside of each of its four sides and wherein a pair of vertical rack members are fixed to opposite sides of said shrink frame and extend downwardly on opposite sides of said passageway into driving engagement with a motor driven pinion.

9. An apparatus according to claim 1 wherein said conveyer comprises a pair of spaced, parallel, synchronously driven drive chains, and a plurality of spaced discrete loading sections having intermediate gaps and wherein said welding and severing means comprises a pair of relatively movable heating and bumper members, one of said members fixed beneath the upper loop of said conveyer and in vertical registration with one of said gaps at the downstream side of said loading section when said conveyer is immobile and the other of said members is mounted to a vertically reciprocatable cross beam having a pair of downwardly extending rack members fixed at its opposite ends and extending downwardly into reciprocatingly drivable engagement with a pair of cooperating, motor driven pinions for descending toward said fixed member and intermediately gripping and heating film interposed between said members.

10. An apparatus according to claim 9 wherein said heat shrink means comprises an upwardly radiating infrared radiator means mounted below said conveyer at said shrink station; a carriage mounted for descendable reciprocation at said shrink station; and infrared radiator means mounted to said carriage for descending, radiating heat energy onto a package at said shrink station and ascending when said conveyer is immobile.

11. An apparatus according to claim 9 wherein said control means includes a detector means mounted at the welding station for detecting the presence of said articles at said welding station for enabling operation of the welding and severing means when articles are present at the welding station at the end of a discrete advance of said conveyer by one loading section increment and for enabling said heat shrink means when articles are present at the beginning of a discrete advance of said conveyer by one loading section increment.

12. An apparatus according to claim 10 wherein said control means includes timing means for holding said carriage and said cross beam at the bottom of its descent for a selected period of time and for controlling the heating time interval of said welding and severing means.

13. An apparatus according to claim 1 wherein a cooling station is provided along said treatment passageway downstream of said heat shrink station.

* * * * *